G. E. HULSE.
FLUID PRESSURE REGULATOR.
APPLICATION FILED SEPT. 24, 1907.

905,187.

Patented Dec. 1, 1908.

WITNESSES:
H. C. Lummis
Samuel L. Alpert.

INVENTOR
G. E. Hulse
BY
Duell, Warfield & Duell
ATTORNEYS

UNITED STATES PATENT OFFICE.

GEORGE E. HULSE, OF NEWARK, NEW JERSEY, ASSIGNOR TO THE SAFETY CAR HEATING & LIGHTING COMPANY, A CORPORATION OF NEW JERSEY.

FLUID-PRESSURE REGULATOR.

No. 905,187.  Specification of Letters Patent.  Patented Dec. 1, 1908.

Application filed September 24, 1907. Serial No. 394,347.

*To all whom it may concern:*

Be it known that I, GEORGE E. HULSE, residing at Newark, in the county of Essex and State of New Jersey, have invented certain new and useful Improvements in Fluid-Pressure Regulators, of which the following is a full, clear, and exact description, such as will enable others skilled in the art to which it appertains to make and use the same.

This invention relates to fluid pressure regulators and one of the objects thereof is to provide a regulator of the above type of reliable and positive action which will automatically regulate the supply of gas and retain a constant pressure in the conducting conduits of a gas lighting system.

Another object of the invention is to arrange in a regulator of the above type means for adjusting the tension of the gas pressure regulating devices in such manner as to permit a ready access thereto for the purposes of repair or adjustment.

Other objects will be in part obvious and in part pointed out hereinafter.

Figure 1:
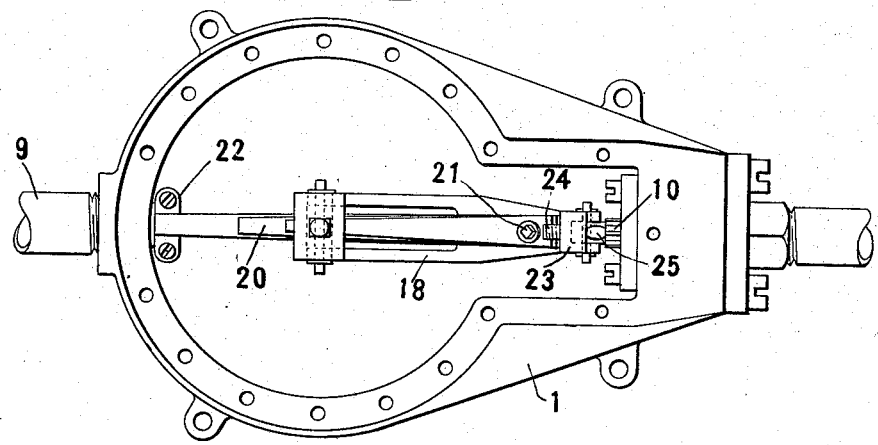
Figure 2:
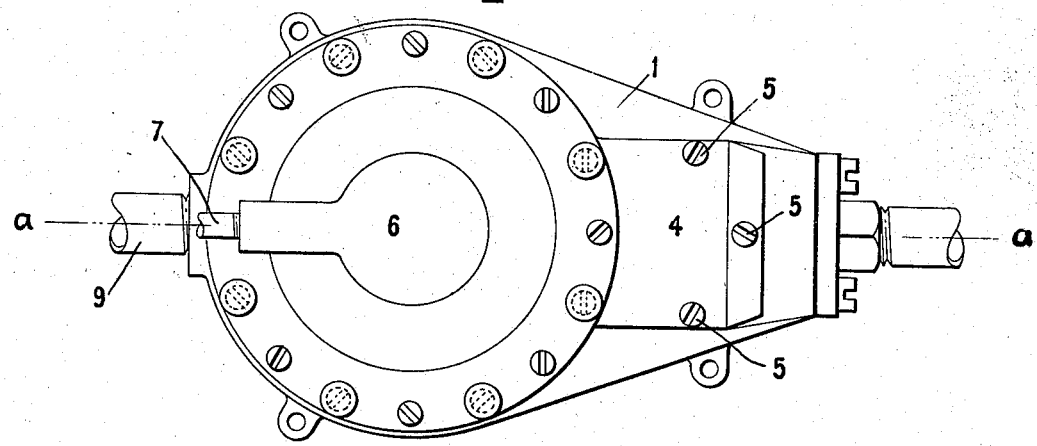
Figure 3:
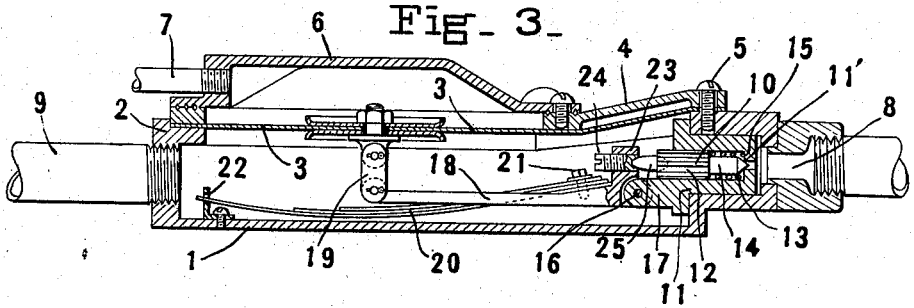

In the accompanying drawings, wherein is illustrated one of the various possible embodiments of my invention, Figure 1 is a view in top elevation of a regulator constructed in accordance therewith having its cover portion removed; Fig. 2 is a similar view of the regulator in assembled condition; and Fig. 3 is a cross sectional view taken on line *a—a* of Fig. 2.

Similar reference characters refer to similar parts throughout the several figures of the drawings.

Referring now to the drawings, the casing 1 is shown as provided with a peripheral ledge 2 upon which rest the edges of a flexible diaphragm 3. A section 4 of casing 1 is shown as being detachably secured thereto, as by means of clamp screws 5, said detachable portion extending inwardly toward the center of the casing. The diaphragm extends underneath this portion and is clamped underneath the same by clamp screws 5. A cover portion 6 is secured to ledge 2 said cover portion being vented to the atmosphere by means of a pipe 7 which leads therefrom.

Casing 1 is provided with an inlet port 8 which conducts the gas from a source of supply beneath diaphragm 3 said gas being discharged from beneath the diaphragm by means of an outlet pipe 9.

The flow of gas through inlet port 8 is controlled by means of a valve 10 which works against a seat 11' formed within a valve casing 11 set within the casing into which leads port 8, said valve being exteriorly recessed as at 12 to admit of a free passage of gas to the interior of the casing. A coil spring 13 encircles a reduced portion 14 of valve 10 said spring acting against the valve and a shoulder 15 formed within casing 11 normally to urge the valve from its seat. Pivoted at 16 to an arm 17 extending from casing 11 is a bell crank lever 18 one end of which is bifurcated and extends within the casing to a position beneath the central portion of the diaphragm to which it is connected by means of a link 19.

A leaf spring 20 extends between the bifurcated portions of lever 18. This spring has a permanent bend and is secured at one end to said lever as by means of screw 21 the opposite end of said spring being engaged in a fixed support 22 arranged within the casing. Threaded in arm 23 of bell crank lever 18 is an adjusting screw 24 which at its inner end engages a knuckle 25 extending from valve 10. It will be observed that leaf spring 20 through lever 18 opposes an expansive movement of the diaphragm and tends to swing adjusting screw 24 inwardly within the casing said valve member being held in constant engagement with said adjusting screw by means of coil spring 13.

Having thus described my invention, the operation thereof is substantially as follows: The gas from the source of supply flows through an inlet port 8, thence through the valve seat 11' to the chamber formed between the diaphragm and the lower portion of the casing, thence through the outlet port 9 to the distributing pipes. When the pressure within the chamber increases to a sufficient degree to lift diaphragm 3 against the tension of spring 20, lever 8 is swung upwardly within the casing thereby forcing valve 10 against its seat and shutting off the flow of gas into the casing. The valve continues in its seated condition until the pressure in the chamber falls below the tension of spring 20 whereupon the same is opened by spring 13 to allow a further flow of gas therein.

It will accordingly be seen that I have devised an improved pressure regulator adapted to attain, among others, all the ends and objects above pointed out, in an exceedingly simple yet efficient manner. The tension of springs 20 and 13 may be conveniently adjusted by means of a single turning of adjusting screw 24 to which access may be readily had by removing portion 4 and cover portion 6 from their supporting ledge. The leaf spring extending through the bifurcated portions of the bell-crank lever acts thereon in such a way as to insure against any racking strains and prevents any binding in the pivotal mounting of the controlling lever.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. In a fluid pressure regulator, the combination with a casing, of a diaphragm supported therein, an inlet pipe connected with said casing, an outlet pipe leading therefrom, a valve for controlling the flow of gas through the inlet pipe, a lever connected with said diaphragm and having operative connection with said valve, one leg of said lever being bifurcated, a leaf spring secured to said lever and adapted to oppose the distention of said diaphragm, said leaf spring extending between the bifurcated parts of said lever, and a support within the casing to which said lever is secured.

2. In a fluid pressure regulator, the combination with a casing, of a diaphragm supported within the same, inlet and outlet ports for said casing, a valve for controlling the flow of gas through the inlet port, a lever connected with said diaphragm and having operative connection with said valve, a spring engaging said lever and adapted through the same to oppose a distention of the diaphragm, a spring directly engaging the valve and adapted to urge the same from its seat, and common means for adjusting the tension of said springs.

3. In a fluid pressure regulator, the combination with a casing, of a diaphragm supported within the same, an inlet pipe leading into said casing, an outlet pipe leading therefrom, a valve interposed in the avenue of flow of gas through said inlet pipe, a bell-crank lever having one end bifurcated and connected with said diaphragm, an adjusting screw threaded into the opposite end of said lever and engaging said valve, a coil spring engaging said valve and holding the same in engagement with said adjusting screw, a leaf spring secured to said lever and extending through the bifurcated portions thereof, and a support within the casing for the opposite end of said spring, said adjusting screw being adapted to regulate the tension of both of said springs.

4. In a fluid pressure regulator, in combination, a casing having a ledge adapted to support the edges of a flexible diaphragm, a portion of said ledge being detachable, a cover portion secured to the casing, said casing being provided with inlet and outlet ports, a valve interposed in said inlet port and adapted to control the flow of gas therethrough, a coil spring encircling a portion of said valve and adapted to urge the same from its seat, a bell-crank lever swiveled within the casing, one end of which is connected to said diaphragm, an adjusting screw threaded into the opposite end of said bell-crank lever, and adapted to engage said valve, and a leaf spring secured to said lever and to a fixed support within the casing adapted to oppose an expansion of the diaphragm, said inlet port, said valve, and the operating mechanism therefor being located directly beneath the removable ledge of said casing.

In testimony whereof I affix my signature, in the presence of two witnesses.

GEORGE E. HULSE.

Witnesses:
  G. R. JEWETT,
  E. E. ALLBEE.